United States Patent [19]

Stettes et al.

[11] B  3,993,423
[45] Nov. 23, 1976

[54] MULTILEVEL VULCANIZING PRESS

[75] Inventors: Karl-Friedrich Stettes, Dabringhausen; Hans-Joachim Körber, Witzhelden, both of Germany

[73] Assignee: Goetzewerke Friedrich Goetze A.G., Burscheid, Germany

[22] Filed: Mar. 5, 1975

[21] Appl. No.: 555,456

[44] Published under the second Trial Voluntary Protest Program on March 30, 1976 as document No. B 555,456.

[30] Foreign Application Priority Data
Mar. 5, 1974 Germany.......................... 2410384

[52] U.S. Cl............................... 425/339; 425/341; 425/394
[51] Int. Cl.² .................... B29H 5/20; B29J 5/00; B29H 7/00; B29C 7/00; B29C 17/00
[58] Field of Search .......... 425/338, 339, 340, 341, 425/342, 394

[56] References Cited
UNITED STATES PATENTS

| | | | |
|---|---|---|---|
| 1,291,637 | 1/1919 | Burkhardt | 425/338 |
| 2,543,582 | 2/1951 | Lyijynen | 425/339 X |
| 3,068,512 | 12/1962 | van Houten | 425/338 |
| 3,206,800 | 9/1965 | Müller | 425/339 X |
| 3,242,532 | 3/1966 | Borah | 425/338 |
| 3,611,482 | 10/1971 | Hutz | 425/338 X |
| 3,824,058 | 7/1974 | Axer et al. | 425/338 |

FOREIGN PATENTS OR APPLICATIONS

| | | |
|---|---|---|
| 1,273,141 | 8/1961 | France |
| 1,167,011 | 4/1964 | Germany |

*Primary Examiner*—J. Howard Flint, Jr.
*Attorney, Agent, or Firm*—Spencer & Kaye

[57] ABSTRACT

A multilevel vulcanizing press is provided which includes a press housing having at least two press levels. Each press level is capable of receiving a molding tool which can be opened and closed within the press housing. Each molding tool is comprised of a plurality of molding plates and can be opened at right angles to the mold parting plane. First and second servicing stations are provided on different sides of the press housing, with each station being able to accommodate a molding tool from each level of the press housing. A first holding station is provided between the press housing and first servicing station for receiving a molding tool from each level of the press housing and a second holding station is provided between the press housing and second servicing station for receiving a molding tool from each level of the press housing. Guide means are provided for guiding each molding tool from the press housing into one of the holding stations and into one of the servicing stations and vice versa.

5 Claims, 1 Drawing Figure

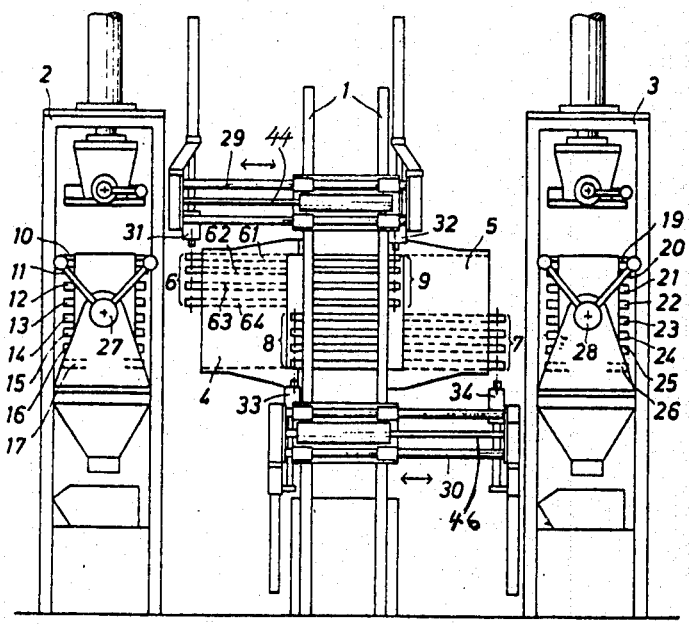

MULTILEVEL VULCANIZING PRESS

FIELD OF THE INVENTION

The present invention relates to a multilevel vulcanizing press.

BACKGROUND OF THE INVENTION

Multilevel vulcanizing presses such as a two-level vulcanizing press are known in the art. These presses generally include a press housing and two servicing stations disposed on both sides of the press housing to accommodate molding tools which can be opened at right angles to the mold parting plane. Each molding tool can include a plurality of mold plates and is movable via guide means from the press housing into one of the servicing stations and vice versa. Each molding tool can be opened and closed within the press housing.

In order to produce particularly small mass-produced articles of rubber, such as gaskets, for example, molding tools are used which, depending on their structural configuration and size of the articles to be produced therewith, comprise three or more mold plates which usually have multinested inserts. Particularly, when injection molding processes are employed, further mold plates are required to hold the injection cylinder and piston.

Depending on the size of the molding tool and the required pressure, it is possible to simultaneously accommodate in one vulcanizing press a plurality of molding tools which are arranged at different levels. The dual-level presses often used for this purpose include a columnar press housing and two servicing stations disposed opposite one another at both sides of the press housing. While the press serves to close, vulcanize and open the molding tools, the servicing stations are provided for emptying, cleaning and possibly filling the individual mold plates.

For this purpose, the mold plates of each molding tool are individually moved via guide rails from the press into their respective servicing stations where both sides of each plate are made accessible to the operating personnel by pivoting each plate 180° about a horizontal axis.

In the past only one mold plate could be serviced at a time and the press was therefore maintained in an open position until the servicing of all plates was completed. Keeping the press open during this servicing period causes the temperature in the press to drop considerably so that much time and energy had to be expended before each new vulcanization process. In addition, the capacity of the press was utilized only about one-half, if it is assumed that the servicing period, as a rough estimate, approximately corresponds to the pressing period.

German Pat. No. 1,032,568 discloses a phonograph record press with two pressing levels where during servicing of one molding tool a second molding tool is in the press at the same level. By alternatingly removing the one molding tool from the press and simultaneously introducing the other molding tool into the press the servicing of the molding tools can take place parallel in time with the pressing process so that a shorter operating cycle is attained for the press. In the known phonograph record press this can very easily be structurally realized since the molding tools consist merely of two molding plates which can be opened in the manner of a hinge for producing a single easily removable article.

SUMMARY OF THE INVENTION

It is an object of the present invention to improve the above-described type of multilevel vulcanizing press. It is a further object of the present invention to provide a multilevel vulcanizing press with greater press capacity.

Additional objects and advantages of the present invention will be set forth in part in the description which follows and in part will be obvious from the description or can be learned by practice of the invention. The objects and advantages are achieved by means of the instrumentalities and combinations particularly pointed out in the appended claims.

To achieve the foregoing objects and in accordance with its purpose, the present invention provides a multilevel vulcanizing press which comprises a press housing containing at least two press levels, with each press level capable of receiving a molding tool which can be opened and closed within the press housing, with each molding tool being comprised of a plurality of molding plates and which can be opened at a right angle to the mold parting plane, a first servicing station on one side of said housing for accommodating a molding tool from each level of the press housing, a second servicing station on another side of the housing for accommodating a molding tool from each level of the press housing, a first holding station between the press housing and first servicing station for receiving a molding tool from each level of the press housing, a second holding station between the press housing and second servicing station for receiving a molding tool from each level of the press housing, and guide means for guiding each molding tool from the press housing into one of the holding stations and into one of the servicing stations and vice versa.

In using the press of the present invention, after each pressing, the open molding tool within each press level is pushed out of the press housing into a holding station and at the same time a second, likewise open molding tool is pushed from an oppositely disposed second holding station into the press housing so that a new pressing process can immediately be initiated. In practicing the invention, the open molding tools in the press are not pushed into the same holding station, but one open molding tool from one press level is pushed into one service station and a second open molding tool in a second press level is pushed into the second holding station. Due to the particularities of rubber, closing of the molding tools outside of the press is impossible since otherwise the polymerization of the rubber mixture would take place too early, i.e. before the pressing process. Whereas the molding plates of the open molding tools have previously been held ready for servicing inside the press, the now provided holding stations for the open molding tools make it possible to pull manually the molding plates individually from the holding station into the servicing station, where they can be emptied, cleaned and refilled if required.

In a preferred embodiment of the invention, the holding station is thermally insulated toward the outside in order to keep the heat loss in the open molding tool at a minimum. In this connection, an additional heating device can be provided in the holding station which, on the one hand, additionally counteracts the heat loss and/or on the other hand compensates by heating the molding tool for the unavoidable heat loss during handling of the individual mold plates in the servicing station.

In a further preferred embodiment of the invention, a displacement means is provided at each press level for laterally displacing the open molding tools on each press level from the press housing to the holding station and vice versa. This displacement means simultaneously acts on all of the mold plates of all of the molding tools of each press level. This can be effected particularly easily in that each displacement means is provided with take-up bolts which can be pushed through corresponding recesses in all of the molding plates in each tool of each press level. It is to be understood that both the foregoing general description and the following detailed description are exemplary and explanatory but are not restrictive of the invention.

DESCRIPTION OF THE DRAWING

The accompanying drawing illustrates an example of a preferred embodiment of the invention, and together with the description serves to explain the principles of the invention.

The sole FIGURE of the drawing is a schematic view of a dual-level vulcanizing press constructed in accordance with the teachings of the invention.

DETAILED DESCRIPTION OF THE INVENTION

Referring to the drawing, there is shown a dual-level vulcanizing press which includes a central press housing 1 in which the drive mechanism is not shown in order to bring out more clearly the features of the present invention. Press housing 1 contains a first upper pressing level which can accommodate a molding tool and a second lower press level which can accommodate a second molding tool. The upper press level can accommodate a molding tool, such as a molding tool 6 or a molding tool 9, which contains four molding plates. Similarly, the lower press level can accommodate a molding tool, such as a molding tool 7 or a molding tool 8, which contains four molding plates. As shown with reference to molding tool 6, each molding tool contains four molding plates 61, 62, 63 and 64 which during the pressing and vulcanizing process are closed in the direction perpendicular to the mold parting plane.

On both sides of press housing 1, that is, on opposite sides of the press housing, two servicing stations 2 and 3 are provided, the size of which corresponds approximately to the size of the press housing. Servicing stations 2 and 3 are used to empty, clean or fill the mold plates. Servicing station 2 contains two levels corresponding to the levels in press housing 1 and can accommodate an open molding tool from each level of press housing 1. Servicing station 3 similarly contains two levels corresponding to the levels in press housing 1 and can accommodate an open molding tool from each level of the press housing. To accomplish this, servicing station 2 is provided with eight guide rails 10 to 17, with each guide rail being capable of accommodating a molding plate of an open molding tool, and servicing station 3 is similarly provided with eight guide rails 19 to 26. The top four guide rails in each servicing station are provided for the molding tools in the upper press level and the bottom four guide rails in each servicing station are provided for the molding tools in the lower press level. Guide rails 10 to 17 and 19 to 26 can be pivoted about axes 27 or 28, respectively, by 180° so that the servicing personnel has easy access to both surfaces of the mold plates. As will be explained in greater detail below, in the preferred operation of the press, each service station holds only one open molding tool during each servicing period.

In accordance with the invention, a first holding station 4 is provided between press housing 1 and servicing station 2 and a second holding station 5 is provided between press housing 1 and servicing station 3. Holding device 4 contains two levels corresponding to the levels of press housing 1 and servicing station 2 and can receive an open molding tool from each level of press housing 1. Holding device 5 similarly contains two levels corresponding to the levels of press housing 1 and servicing station 3 and can receive an open molding tool from each level of the press housing. To accomplish this, press housing 1 and holding stations 4 and 5 are each provided with guide rails, which are not shown in detail, to hold and support the molding plates of the molding tools in open position so that the molding plates can be transferred in open position from the press housing to the holding stations and then back to the press housing.

The holding stations 4 and 5 each are provided with a jacket of heat-insulating material. Additional heating devices, which are not shown in detail, can be provided inside the jackets to protect the molding tools against too much heat loss and to reheat the tools upon completion of servicing for the new pressing process. The main heating assemblies required for the vulcanizing process, however, are disposed in the press housing 1.

In a preferred embodiment of the invention displacement means are provided to displace the molding tools between the press housing and holding station. As shown in the drawing, a first displacement means 29 is provided at the top of the press to move the molding tools 6 and 9 that operate in the upper first level of press housing 1 between the press housing and holding stations 4 and 5, and a second displacement means 30 is provided at the bottom of the press to move molding tools 7 and 8 that operate in the lower second level of press housing 1 between the press housing and holding stations 4 and 5. Displacement means 29 includes a horizontally movable carriage 44, which supports a pair of vertically movable bolts 31 and 32 on opposite ends of the carriage. Similarly, displacement means 30 includes a horizontally movable carriage 46 which supports a pair of vertically movable bolts 33 and 34 on opposite ends of the carriage. Bolts 31 and 32 can be pushed through recesses in the molding plates of molding tools 6 and 9 and bolts 33 and 34 can be pushed through recesses in the molding plates of molding tools 8 and 7. Upon insertion of bolts 31, 32, 33 and 34 into the respective molding tools 6, 9, 8 and 7, carriages 44 and 46 can then be moved either to the right or left to move the molding tools to their next desired position in the molding cycle.

In operation, two molding tools, such as molding tools 8 and 9 as shown in the drawing, are maintained in press housing 1 while another molding tool 6 is maintained in holding station 4 at the same level as molding tool 9 and a molding tool 7 is maintained in holding station 5 at the same level as molding tool 8. During pressing with molding tools 8 and 9, molding tools 6 and 7 are readied for servicing in holding stations 4 and 5, respectively, transferred to the respective servicing stations 2 and 3 for servicing and then returned to their respective holding stations. The press is then opened and bolts 31, 32, 33 and 34 are inserted into their respective open molding tools 6, 9, 8 and 7 whereupon carriage 44 is moved to the right, as viewed in the drawing, to bring open molding tool 9 into holding station 5 and open molding tool 6 into press housing 1. Similarly, carriage 46 is moved to the left, as viewed in the drawing, to bring open molding tool 8 into holding station 4 and open molding tool 7 into press housing 1. Bolts 31, 32, 33 and 34 are removed and the press is then closed to effect pressing in molding tools 6 and 7. During this pressing, open molding tools 8 and 9 are readied for service in their respective holding stations 4 and 5, transferred to the respective servicing stations 2 and 3 then returned to their respective holding stations. The press is then opened, bolts 31, 32, 33 and 34 are again inserted into their respective open holding tools 6, 9, 8 and 7, whereupon carriage 44 is moved to the left and carriage 46 is moved to the right to bring the molding tools back to their original position as shown in the drawing and ready for the next molding cycle. Thus, each holding station 4 and 5 has only one of its holding levels used during any one holding period, and the other of its holding levels is used during the next holding period. Similarly, each servicing station 2 and 3, has only one of its servicing levels used during any one servicing period and the other of its servicing levels is used during the next servicing period. Thus, alternate levels of the holding stations and servicing stations are used during successive molding cycles. Each displacement means connects the pressing level on which it operates with the corresponding holding level in both holding stations and enables the two holding stations to alternatingly accommodate open molding tools from each pressing level.

The invention is illustrated in the drawing as a dual-level vulcanizing press. With the same success, however, it can also be used for multilevel presses having a different number of press levels such as presses having 4 or 6 levels. Further, in practicing the present invention, the vulcanizing press can be one which operates according to the displacement molding or injection molding process.

It will be understood that the above description of the present invention is susceptible to various modifications, changes and adaptations, and the same are intended to be comprehended within the meaning and range of equivalents of the appended claims.

We claim:

1. Multilevel vulcanizing press comprising:
   a. a press housing containing at least two press levels, with each press level capable of receiving a molding tool which can be opened and closed within the press housing, with each molding tool being comprised of a plurality of molding plates and which can be opened at a right angle to the mold parting plane;
   b. a first servicing station on one side of said housing for accommodating a molding tool from each level of the press housing;
   c. a second servicing station on another side of said housing for accommodating a molding tool from each level of the press housing;
   d. a first holding station between the press housing and the first servicing station for receiving a molding tool from each level of the press housing;
   e. a second holding station between the press housing and the second servicing station for receiving a molding tool from each level of the press housing; and
   f. guide means for guiding each molding tool from the press housing into one of the holding stations and into one of the servicing stations and vice versa.

2. Vulcanizing press as defined in claim 1 wherein the holding stations are thermally insulated toward the outside.

3. Vulcanizing press as defined in claim 1 wherein each holding station contains a heating means.

4. Vulcanizing press as defined in claim 1 and further comprising a displacement means on each press level to connect each press level with both holding stations.

5. Vulcanizing press as defined in claim 4 wherein each displacement means contains two bolts which can be moved perpendicularly to the displacement means through recesses in the mold plates of each molding tool.

* * * * *